United States Patent
Matsumoto

(10) Patent No.: US 10,445,580 B2
(45) Date of Patent: Oct. 15, 2019

(54) IMAGE EXTRACTION SYSTEM, IMAGE EXTRACTION METHOD, AND IMAGE EXTRACTION PROGRAM

(71) Applicant: FUJIFILM Corporation, Tokyo (JP)

(72) Inventor: Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 15/681,780

(22) Filed: Aug. 21, 2017

(65) Prior Publication Data

US 2018/0096208 A1    Apr. 5, 2018

(30) Foreign Application Priority Data

Sep. 30, 2016    (JP) .................................. 2016-192883

(51) Int. Cl.
*G06K 9/00* (2006.01)
*G06T 11/60* (2006.01)

(52) U.S. Cl.
CPC ..... *G06K 9/00684* (2013.01); *G06K 9/00671* (2013.01); *G06T 11/60* (2013.01); *G06K 2209/27* (2013.01)

(58) Field of Classification Search
USPC ....................................................... 382/224
See application file for complete search history.

(56) References Cited

U.S. PATENT DOCUMENTS

| | | | | |
|---|---|---|---|---|
| 8,748,113 B2 * | 6/2014 | Matsui | ............... | C07K 16/2887 435/26 |
| 2009/0208106 A1 * | 8/2009 | Dunlop | .............. | G06K 9/00664 382/173 |
| 2011/0112890 A1 * | 5/2011 | Chu | ........................ | G06Q 30/02 705/7.33 |
| 2012/0075676 A1 | 3/2012 | Komoto | | |
| 2013/0259390 A1 * | 10/2013 | Dunlop | .............. | G06K 9/00718 382/224 |
| 2013/0286217 A1 * | 10/2013 | Tsuji | .................. | G06K 9/00221 348/169 |
| 2014/0347475 A1 * | 11/2014 | Divakaran | ......... | G06K 9/00771 348/135 |
| 2015/0086116 A1 | 3/2015 | Yamaji | | |
| 2018/0190382 A1 * | 7/2018 | Ramezani | ............... | H04L 67/22 |

FOREIGN PATENT DOCUMENTS

| | | | | |
|---|---|---|---|---|
| JP | 2007-199924 A | | 8/2007 | |
| JP | 4762731 | * | 8/2011 | ............. G06T 11/60 |
| JP | 4945687 | * | 6/2012 | ............. G06T 11/60 |
| JP | 5676996 B2 | | 2/2015 | |
| JP | 2015-089112 A | | 5/2015 | |

* cited by examiner

*Primary Examiner* — Jerome Grant, II
(74) *Attorney, Agent, or Firm* — Studebaker & Brackett PC

(57) ABSTRACT

Provided are an image extraction system, an image extraction method, and an image extraction program that extract an image matched with a theme. A first theme and a second theme are determined from a plurality of images. In a case in which the determined second theme is changed, the changed second theme is input. A first image extraction process that extracts an image from the plurality of images on the basis of the first theme is performed and a second image extraction process that extracts an image from the plurality of images on the basis of the second theme is performed. The extracted images are displayed.

15 Claims, 18 Drawing Sheets

IMG001

IMG002

IMG003

IMG004

FIG. 9

| THEME | OBJECT TAG |
|---|---|
| CHILD | BIRTHDAY, ENTRANCE CEREMONY, KINDERGARTEN ENTRANCE CEREMONY, GRADUATION CEREMONY, KINDERGARTEN GRADUATION CEREMONY, SEVEN-FIVE-THREE FESTIVAL, CHILDREN'S DAY, GIRL'S DAY, CHRISTMAS, JANUARY - - - |
| TRAVEL | VEHICLE (AIRPLANE, ELECTRIC TRAIN, CAR), TOURIST SPOT, FOOD (FEATURE), LANDMARK - - - |
| WEDDING | CHURCH, CHAPEL, RING, BOUQUET, WEDDING DRESS, CAKE - - - |
| \| \| \| | \| \| \| |

FIG. 14

| THEME | TEMPLATE | TEMPLATE EVALUATION VALUE |
|---|---|---|
| CHILD | TEMPLATE T1 | L1 |
| | TEMPLATE T2 | L2 |
| | ⋮ | ⋮ |
| TRAVEL | TEMPLATE T11 | L11 |
| | TEMPLATE T12 | L12 |
| | ⋮ | ⋮ |
| WEDDING | TEMPLATE T21 | L21 |
| | TEMPLATE T22 | L22 |
| | ⋮ | ⋮ |
| ⋮ | ⋮ | ⋮ |

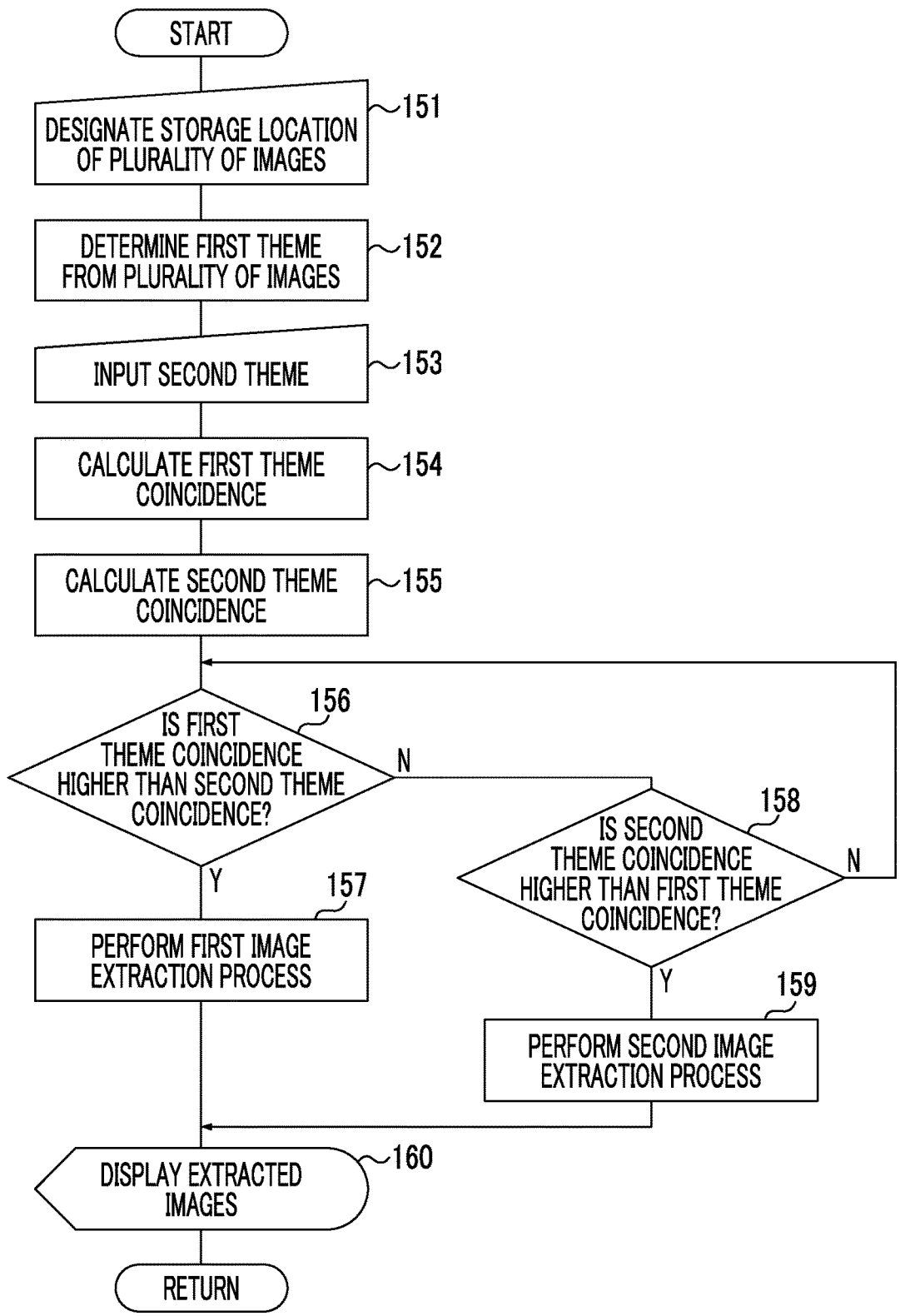

IMAGE EXTRACTION SYSTEM, IMAGE EXTRACTION METHOD, AND IMAGE EXTRACTION PROGRAM

CROSS-REFERENCE TO RELATED APPLICATIONS

The present application claims priority under 35 U.S.C. § 119 to Japanese Patent Application No. 2016-192883, filed Sep. 30, 2016. Each of the above application(s) is hereby expressly incorporated by reference, in its entirety, into the present application.

BACKGROUND OF THE INVENTION

1. Field of the Invention

The present invention relates to an image extraction system, an image extraction method, and an image extraction program.

2. Description of the Related Art

A technique has been achieved which enables a user to select images from a plurality of images and creates an album using the images selected by the user. It is troublesome for the user to select a desired image from a plurality of images. Therefore, a technique has been proposed in which a computer extracts images on the basis of an image extraction algorithm and creates an album using the extracted images. In a case in which an album is created, when the content of the images attached to the album is not related to a template of the album, an inconsistent album is created. For this reason, a technique has been proposed which analyzes the images attached to an album and selects a template from the theme of the analyzed images (JP2015-89112A). In addition, a technique has been proposed which determines the title of an image group included in an album (JP2007-199924A). Furthermore, a technique has been proposed which selects a design theme and lays print content out on the basis of a template associated with the selected design theme (JP5676996B).

SUMMARY OF THE INVENTION

In a case in which a theme indicated by a plurality of images is determined and images matched with the determined theme are extracted from the plurality of images, when the determined theme is not appropriate, images different from the images that are intended by the user are extracted. The technique disclosed in JP2015-89112A selects a template from the theme of the analyzed images, the technique disclosed in JP2007-199924A determines the title of an image group, and the technique disclosed in JP5676996B performs layout on the basis of the template associated with the design theme. Therefore, the extraction of images that are best matched with the theme is not considered in these techniques.

An object of the invention is to extract images that are best matched with a theme.

According to an aspect of the invention, there is provided an image extraction system comprising: a first theme determination device (a first theme determination device) for determining a first theme indicated by a plurality of images from the plurality of images; a second theme determination device (a second theme determination device) for determining a second theme indicated by the plurality of images from the plurality of images or receiving the input second theme and determining the second theme; and an image extraction device (an image extraction device) for performing at least one of a first image extraction process that extracts an image associated with the first theme determined by the first theme determination device from the plurality of images or a second image extraction process that extracts an image associated with the second theme determined by the second theme determination device from the plurality of images.

According to another aspect of the invention, there is provided an image extraction method suitable for the image extraction system. That is, the method comprises: allowing a first theme determination device to determine a first theme indicated by a plurality of images from the plurality of images; allowing a second theme determination device to determine a second theme indicated by the plurality of images from the plurality of images or to receive the input second theme and to determine the second theme; and allowing an image extraction device to perform at least one of a first image extraction process that extracts an image associated with the first theme determined by the first theme determination device from the plurality of images or a second image extraction process that extracts an image associated with the second theme determined by the second theme determination device from the plurality of images. The invention also provides non-transitory computer readable medium storing a computer readable program that controls a computer of an image extraction system.

For example, the second theme determination device may determine the second theme indicated by the plurality of images from the plurality of images. In this case, preferably, the image extraction system further comprises a theme receiving device for receiving the designation of the first theme deter mined by the first theme determination device or the second theme determined by the second theme determination device. In a case in which the theme receiving device receives the designation of the first theme, the image extraction device may perform the first image extraction process that extracts the image associated with the first theme from the plurality of images. In a case in which the theme receiving device receives the designation of the second theme, the image extraction device may perform the second image extraction process that extracts the image associated with the second theme from the plurality of images.

The image extraction system may further comprise: a template determination device (a template determination device) for determining a first template associated with the first theme in a case in which the image extraction device performs the first image extraction process and determining a second template associated with the second theme in a case in which the image extraction device performs the second image extraction process; and an album generation device (an album generation device) for attaching the image extracted in the first image extraction process to the first template in a case in which the template determination device determines the first template and attaching the image extracted in the second image extraction process to the second template in a case in which the template determination device determines the second template to generate an album including the first template and the second template.

The image extraction system may further comprise: a first theme coincidence calculation device (a first theme coincidence calculation device) for calculating a first theme coincidence indicating a degree of coincidence with the first theme determined by the first theme determination device for the plurality of images; a second theme coincidence calculation device (a second theme coincidence calculation device) for calculating a second theme coincidence indicating a degree of coincidence with the second theme determined by the second theme determination device for the plurality of images; and an album generation device (an album generation device) for generating an album with themes corresponding to a ratio of the first theme coincidence calculated by the first theme coincidence calculation device to the second theme coincidence calculated by the second theme coincidence calculation device, using the images extracted by the image extraction device.

The image extraction device may perform the first image extraction process and the second image extraction process such that the ratio of the first theme coincidence calculated by the first theme coincidence calculation device to the second theme coincidence calculated by the second theme coincidence calculation device is equal to a ratio of the number of images extracted by the first image extraction process to the number of images extracted by the second image extraction process.

The image extraction system may further comprise an album generation device (an album generation device) for attaching the images extracted by the image extraction device to a template that is common to the first theme determined by the first theme determination device and the second theme determined by the second theme determination device to generate an album.

The image extraction system may further comprise an album generation device (an album generation device) for attaching the images extracted by the image extraction device to a template with themes corresponding to a ratio of the first theme determined by the first theme determination device to the second theme determined by the second theme determination device to generate an album.

The image extraction system may further comprise a template generation device (a template generation device) for generating the template with the themes corresponding to the ratio of the first theme determined by the first theme determination device to the second theme determined by the second theme determination device.

The image extraction device may perform at least one of the first image extraction process or the second image extraction process which extracts images matched with themes corresponding to a ratio of the first theme determined by the first theme determination device to the second theme determined by the second theme determination device.

The second theme determination device may receive the input second theme and determine the second theme. The image extraction system may further comprise: a first theme coincidence calculation device (a first theme coincidence calculation device) for calculating a first theme coincidence indicating a degree of coincidence with the first theme determined by the first theme determination device for the plurality of images; and a second theme coincidence calculation device (a second theme coincidence calculation device) for calculating a second theme coincidence indicating a degree of coincidence with the second theme determined by the second theme determination device for the plurality of images. In this case, the image extraction device may perform the first image extraction process in a case in which the first theme coincidence calculated by the first theme coincidence calculation device is higher than the second theme coincidence calculated by the second theme coincidence calculation device and perform the second image extraction process in a case in which the second theme coincidence calculated by the second theme coincidence calculation device is higher than the first theme coincidence calculated by the first theme coincidence calculation device.

According to the invention, the first theme indicated by a plurality of images is determined from the plurality of images. In addition, the second theme indicated by the plurality of images is determined from the plurality of images or the input second theme is received and determined. At least one of the first image extraction process that extracts the image associated with the first theme from the plurality of images or the second image extraction process that extracts the image associated with the second theme from the plurality of images is performed. The first image extraction process is performed on the basis of the first theme determined from the plurality of images. Therefore, in a case in which the first theme is not appropriately determined, the images that are not intended by the user are likely to be extracted. According to the invention, the second theme indicated by a plurality of images is determined from the plurality of images or the input second theme is received and determined. It is possible to perform the second image extraction process based on the second theme, in addition to the first image extraction process. Therefore, in a case in which it is difficult to appropriately extract images, it is possible to perform the second image extraction process. Relatively appropriate images are extracted by the second image extraction process.

BRIEF DESCRIPTION OF THE DRAWINGS

FIG. 9 illustrates an example of an object tag table.
FIG. 14 illustrates an example of a template table.
FIG. 21 is a flowchart illustrating the procedure of an image extraction system.

DESCRIPTION OF THE PREFERRED EMBODIMENTS

Embodiment 1

Figure 1:
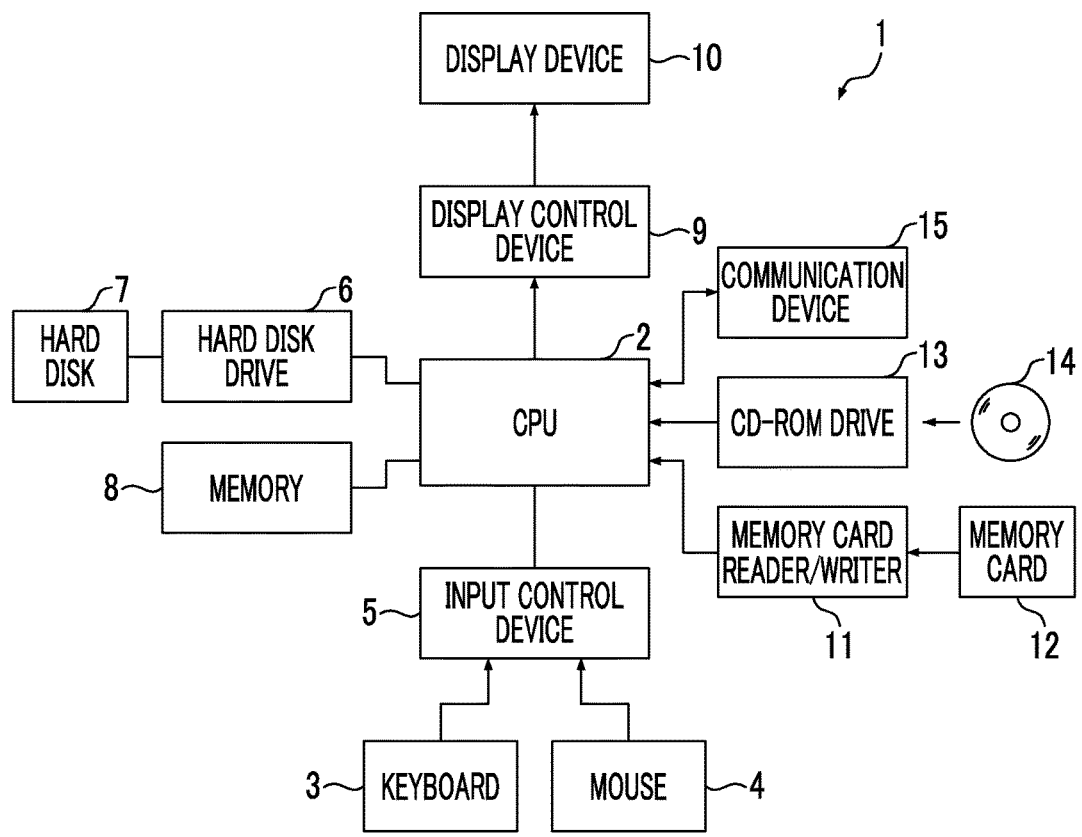
FIG. 1 is a block diagram illustrating the electric configuration of an image extraction system.

FIG. 1 illustrates Embodiment 1 and is a block diagram illustrating the electric configuration of an image extraction system 1.

The overall operation of the image extraction system 1 is controlled by a central processing unit (CPU) 2.

The image extraction system 1 includes a keyboard 3 and a mouse 4 as an input device for inputting, for example, commands to the image extraction system 1. For example, the commands input through the keyboard 3 and the mouse 4 are transmitted to the CPU 2 through an input control device 5. In addition, the image extraction system 1 includes a memory 8 that temporarily stores, for example, data, a hard disk 7, a hard disk drive 6 for accessing the hard disk 7, a display device 10, and a display control device 9 for controlling the display device 10.

The image extraction system 1 further includes a memory card reader/writer 11 for accessing a memory card 12, a compact disc read only memory (CD-ROM) drive 13 for accessing a CD-ROM 14, and a communication device 15 for connection to a network such as the Internet.

The CD-ROM drive 13 reads the CD-ROM 14 (recording medium) storing a computer-readable program that controls an operation which will be described below and the read program is installed in the image extraction system 1. The program may be stored in a portable recording medium, such as the memory card 12, other than the CD-ROM 14 or may be installed in the image extraction system 1 in advance. In addition, the communication device 15 may receive the program through the network, such as the Internet, and the received program may be installed in the image extraction system 1.

Figure 2:
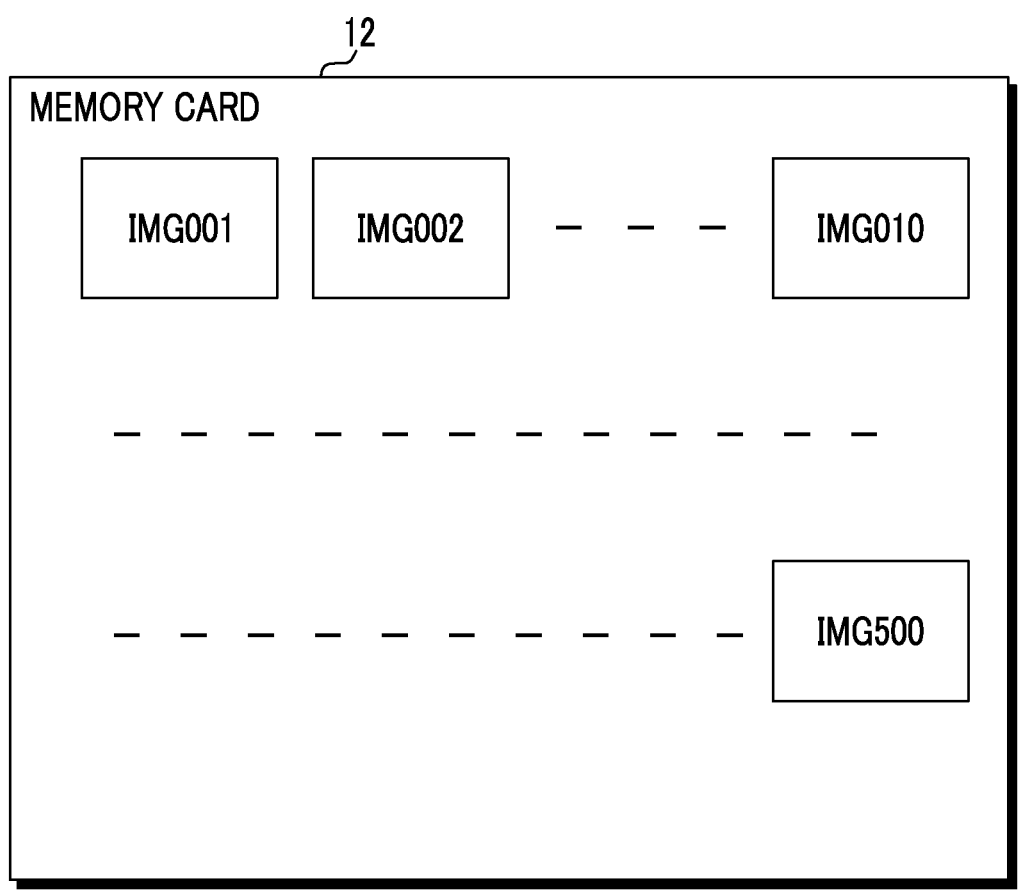
FIG. 2 illustrates image files stored in a memory card.

FIG. 2 illustrates an image file stored in the memory card 12.

It is assumed that the memory card 12 stores 500 image files represented by image file names IMG001 to IMG500. The image file names do not need to be consecutive. For example, a user travels while carrying the memory card 12 and takes pictures at a travel destination. Then, 500 image files are stored in the memory card 12. In addition to image files obtained by imaging in a single event, such as travel, image tiles obtained by imaging at a wedding and image files obtained by imaging during travel (for example, a honeymoon) after the wedding may be stored in the memory card 12. As such, image files obtained by imaging in a plurality of events may be stored in the memory card 12 (a recording medium is not limited to the memory card 12).

FIGS. 3 to 6 illustrate images 31 to 34 indicated by some image files among the 500 image files stored in the memory card 12.

Figure 3:
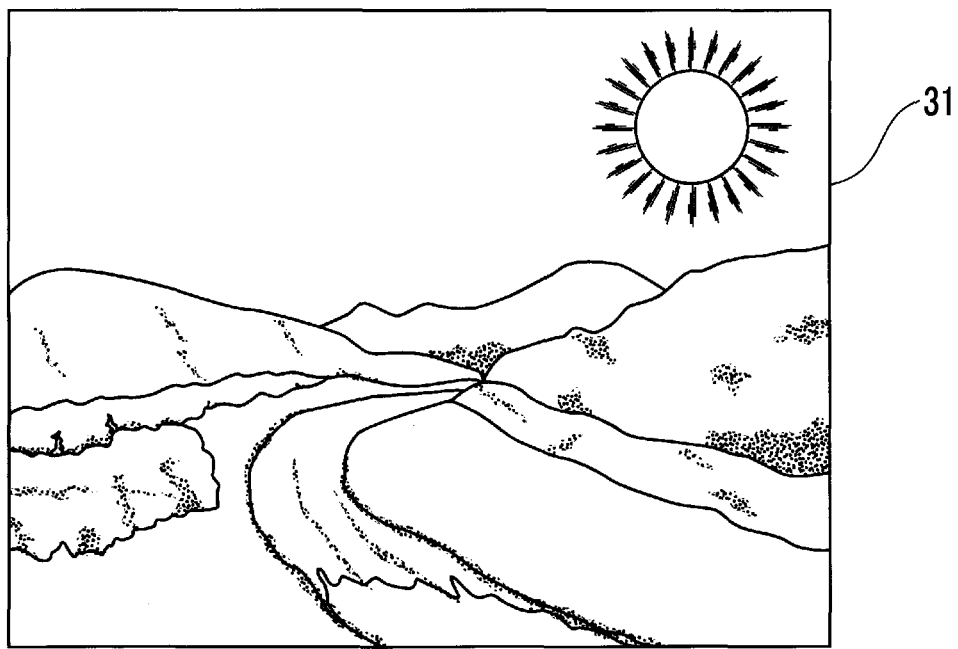
FIG. 3 illustrates an example of an image.

FIG. 3 illustrates an example of the image 31 indicated by an image file name IMG001. The image 31 is an example of an image including a mountain, a river, and the sun.

Figure 4:
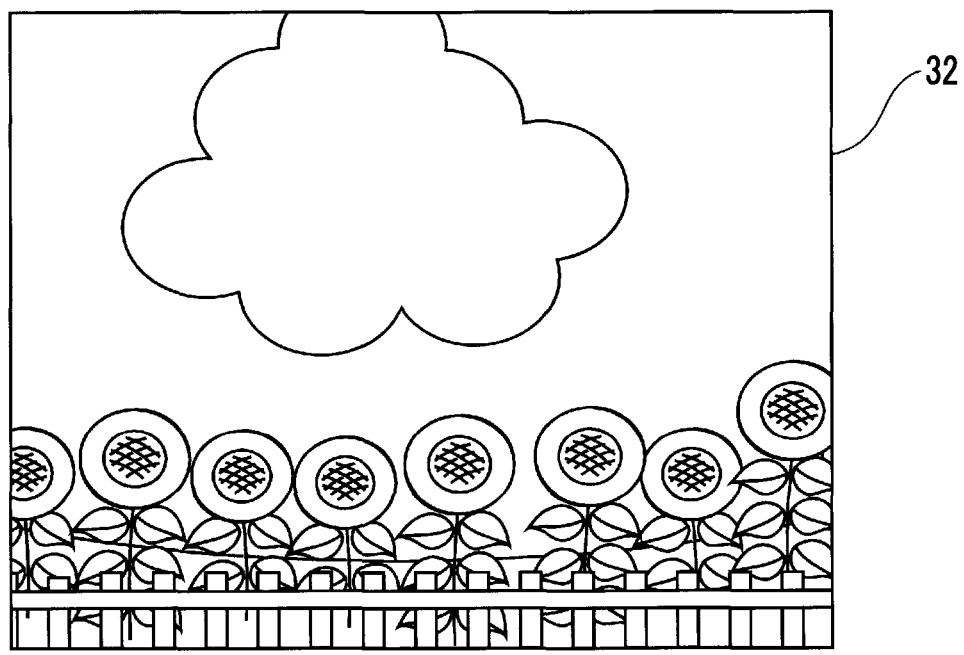
FIG. 4 illustrates an example of an image.

FIG. 4 illustrates an example of the image 32 indicated by an image file name IMG002. The image 32 is an example of an image including a flower and a cloud.

Figure 5:
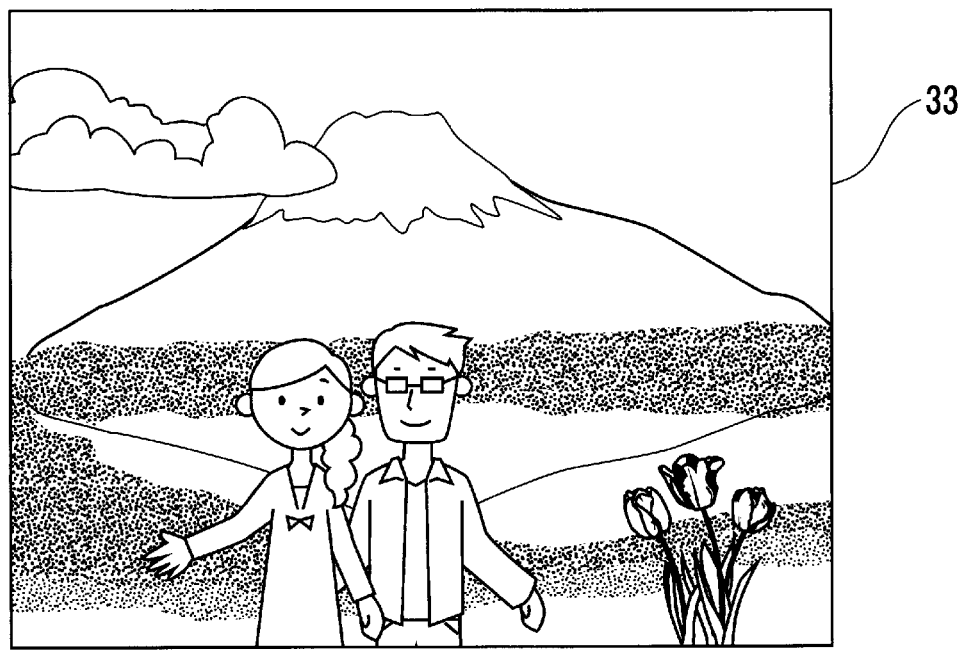
FIG. 5 illustrates an example of an image.

FIG. 5 illustrates an example of the image 33 indicated by an image file name IMG003. The image 33 is an example of an image including a person, a mountain, a cloud, and a flower.

Figure 6:
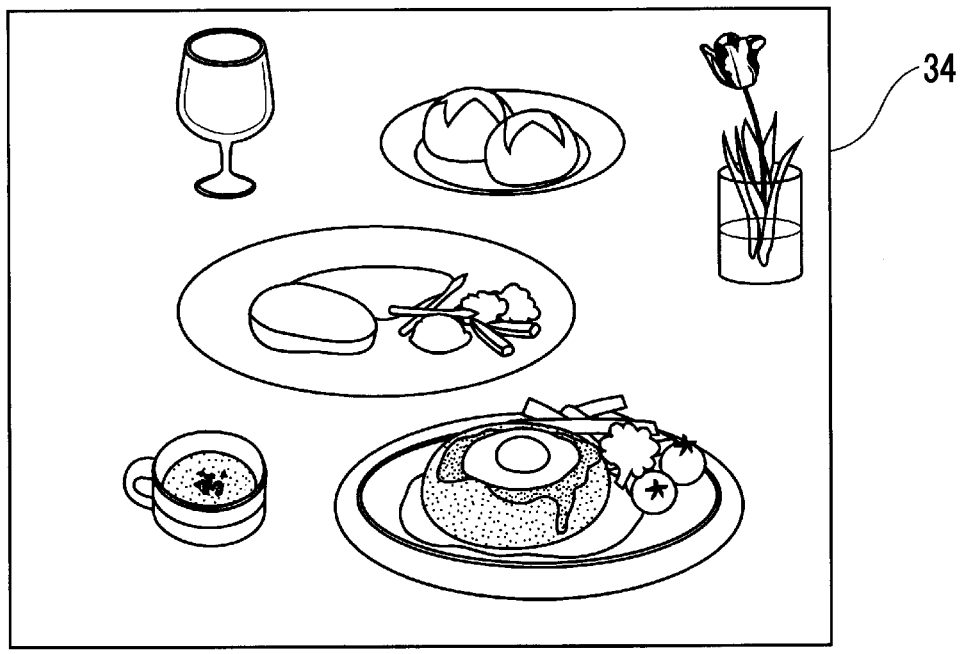
FIG. 6 illustrates an example of an image.

FIG. 6 illustrates an example of the image 34 indicated by an image file name IMG004. The image 34 is an example of an image including food and a flower.

Figure 7:
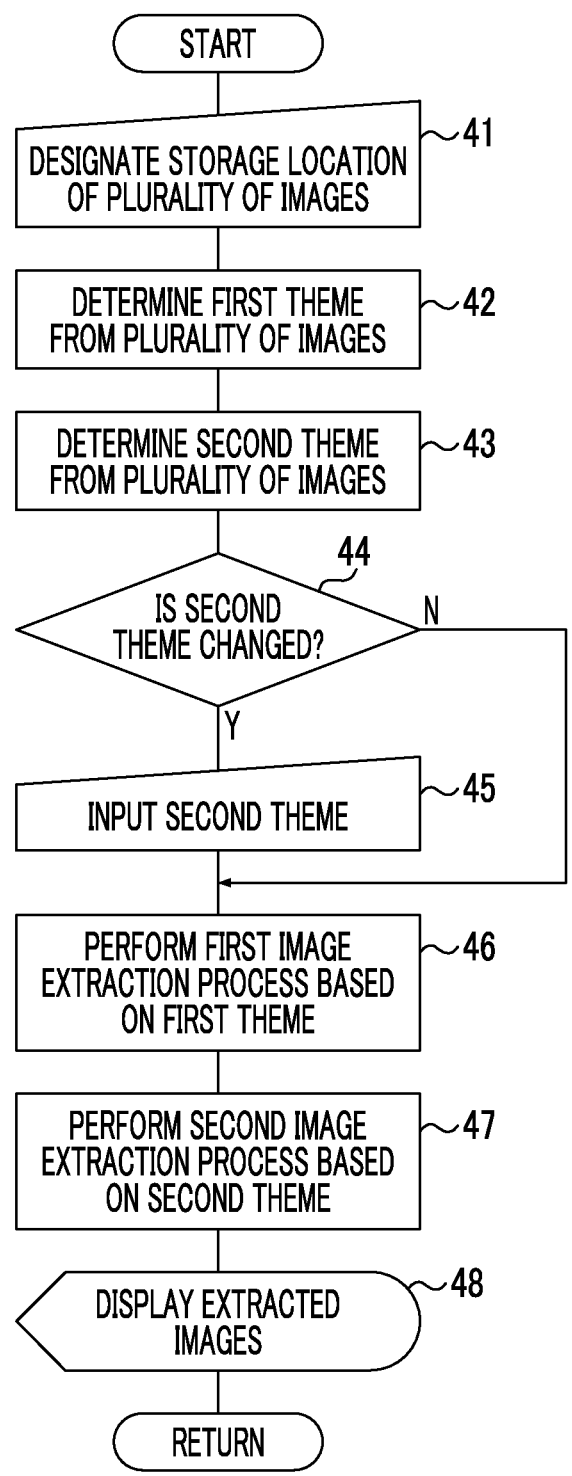
FIG. 7 is a flowchart illustrating the procedure of the image extraction system.

FIG. 7 is a flowchart illustrating the procedure of the image extraction system 1.

A storage location designation image for designating a storage location where a plurality of images are stored is displayed on a display screen of the display device 10. The user can designate the storage location, such as the hard disk 7, the CD-ROM 14, the memory card 12, or a storage area on a network, using the storage location designation image. In a case in which a universal serial bus (USB) memory (not illustrated) can be connected to the image extraction system 1, the USB memory can also be designated as the storage location. The user designates the storage location of images used to generate an album, using the keyboard 3 or the mouse 4 (Step 41). In this embodiment, it is assumed that the user designates the memory card 12 as the image storage location. Before the image storage location is designated or after the image storage location is designated, the range of a plurality of images for determining a first theme and a second theme, which will be described below, may be specified. For example, an imaging period may be designated and the first theme and the second theme may be determined from a plurality of images taken within the designated imaging period.

The CPU 2 reads the plurality of image files stored in the memory card 12. The CPU 2 (a first theme determination device) determines the first theme of a plurality of images indicated by the plurality of read image files on the basis of a first theme determination algorithm (Step 42). A method for determining the first theme will be described in detail below (see FIG. 9). When the first theme is determined, the CPU 2 (a second theme determination device) determines the second theme of the plurality of images indicated by the plurality of image files read from the memory card 12 on the basis of a second theme determination algorithm (which may be the same as the first theme determination algorithm) (Step 43). A method for determining the second theme will be described in detail below.

Figure 8:
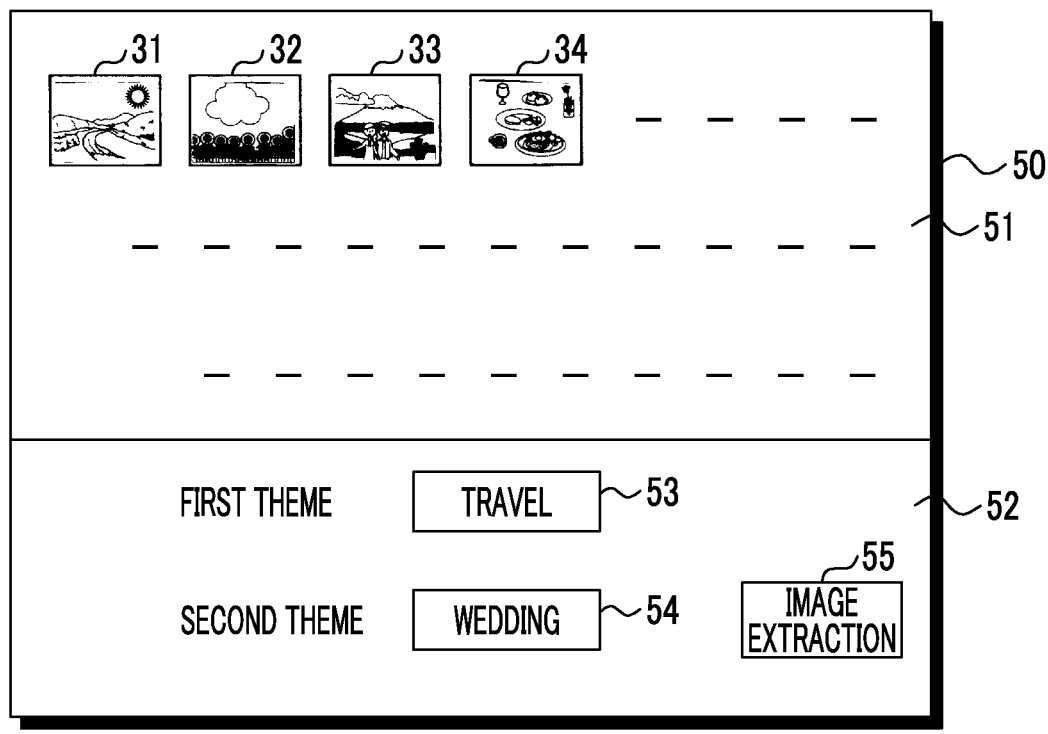
FIG. 8 illustrates an example of a theme determination window.

FIG. 8 illustrates an example of a theme determination window 50 that is displayed on the display screen of the display device 10.

The theme determination window 50 includes an image display region 51 and a theme display region 52.

A list of the images (thumbnail images) which are stored at the storage location designated by the user is displayed in the image display region 51. In this embodiment, since the memory card 12 is designated as the storage location, for example, the images 31 to 34 indicated by the image files stored in the memory card 12 are displayed in the image display region 51.

In the theme display region 52, a first theme display box 53 is formed next to a letter string "first theme" and a second theme display box 54 is formed next to a letter string "second theme". The first theme determined in Step 42 of FIG. 7 is displayed in the first theme display box 53. The second theme determined in Step 43 of FIG. 7 is displayed in the second theme display box 54. In this embodiment, the memory card 12 stores the image files obtained by imaging in an event, such as a wedding, and the image files obtained by imaging in an event, such as travel. It is assumed that "travel" is determined as the first theme and "wedding" is determined as the second theme from a plurality of image files stored in the memory card 12. Therefore, "travel" is displayed in the first theme display box 53 and "wedding" is displayed in the second theme display box 54.

An image extraction button 55 in which letters "image extraction" are displayed is formed in the theme display region 52. The image extraction button 55 is clicked by the user through, for example, the mouse 4 in a case in which images associated with the first theme and the second theme are extracted from the plurality of images stored at the designated storage location.

Returning to FIG. 7, the user checks the second theme displayed in the second theme display box 54 and determines whether the second theme is appropriate. In a case in which the user considers that the second theme is not appropriate, the user removes the second theme displayed in the second theme display box 54, using the keyboard 3, in order to change the second theme (YES in Step 44). Then, the user newly inputs the second theme, using the keyboard 3 (Step 45). When it is not necessary to change the second theme (NO in Step 44), the process in Step 45 is skipped. As such, the CPU 2 (a second theme determination device) may determine the second theme or the CPU 2 may receive a theme input through the keyboard 3 (a second theme determination device) and determine the second theme.

The second theme may not be changed, but the first theme may be changed. Alternatively, both the first theme and the second theme may be changed. For ease of understanding, the first theme and the second theme are distinguished from each other. However, the two themes may be determined or at least one of the two themes may be changed. One of the two themes is the first theme and the other theme is the second theme.

Then, the CPU 2 (an image extraction device) performs a first image extraction process that extracts images associated with the determined first theme from the plurality of images stored at the designated storage location (or images taken for a designated imaging period among the plurality of images stored at the designated storage location) (Step 46). For example, an image that has a high degree of coincidence with the first theme (has a degree of coincidence equal to or greater than a threshold value) and is highly evaluated as an image (for example, an image with appropriate brightness, an image that is in focus, or an image in which an object is not cut) is extracted from the plurality of images. The image having a high degree of coincidence with the first theme means an image that includes an object corresponding to the first theme (for example, which is determined in advance) and includes an object with a high evaluation value (equal to or greater than a threshold value) (the evaluation value becomes larger as the position of the object becomes closer to the center, and increases as the object is in focus). Similarly, the CPU 2 performs a second image extraction process that extracts an image associated with the determined second theme from the plurality of images stored at the designated storage location (Step 47).

The image extracted by the first image extraction process and the image extracted by the second image extraction process are displayed on the display screen of the display device 10 (Step 48). The extracted images correspond to the first theme or the second theme. The images corresponding to the first theme and the second theme are extracted from a plurality of images.

The extracted images are used to generate an album. The images corresponding to at least one of the first theme or the second theme are attached to the generated album. An album corresponding to at least one of the first theme or the second theme is generated.

In the above-described embodiment, both the first image extraction process and the second image extraction process are performed. However, at least one of the first image extraction process or the second image extraction process may be performed. At least one of the image extraction processes is performed and an album is generated using the extracted images. Therefore, an album corresponding to at least one of the first theme and the second theme is generated.

FIG. 9 illustrates an example of an object tag table.

Object tags corresponding to themes are stored in the object tag table. The object tag table is stored in the memory 8. The object tags indicate, for example, the state of images corresponding to the themes and objects corresponding to the themes. For example, a "birthday" and an "entrance ceremony" are stored as the object tags corresponding to a "child" theme. For example, a "vehicle (an airplane, an electric train, or a car)" and a "tourist spot" are stored as object tags corresponding to a "travel" theme. The object tag table is used to determine the first theme and the second theme.

Figure 10:
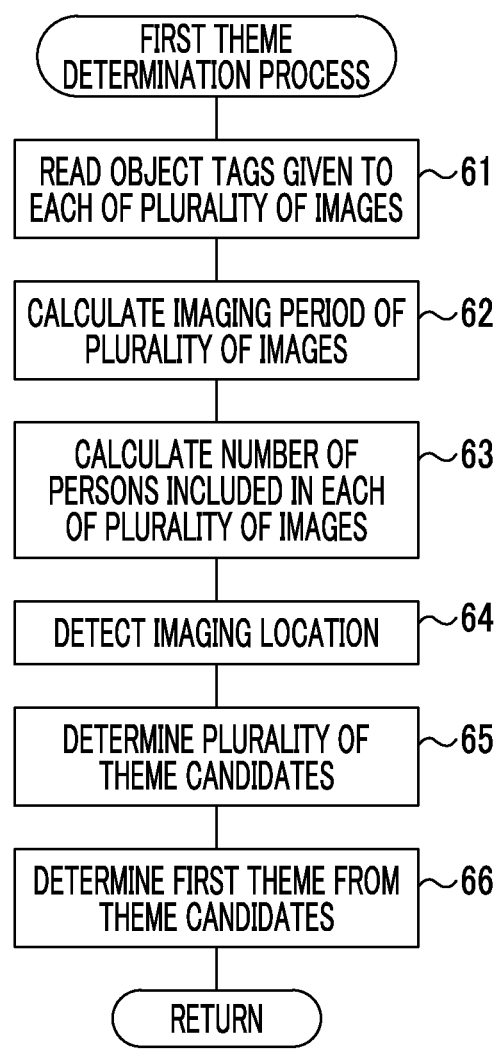
FIG. 10 is a flowchart illustrating the procedure of a first theme determination process.

FIG. 10 is a flowchart illustrating the procedure of the first theme determination process (a procedure in Step 42 of FIG. 7) (first theme determination algorithm).

The object tag is stored in a header of each of the plurality of images stored at the designated storage location (memory card 12). The CPU 2 reads the object tags given to each of the plurality of images (Step 61). In a case in which no object tag is given to an image, the CPU 2 performs image analysis to detect an object included in the image and obtains the object tag.

The CPU 2 calculates the imaging period of the plurality of images (Step 62). In a case in which the imaging period of the images is longer than the interval at which the plurality of images are taken, the plurality of images are divided into a plurality of groups and the imaging period is calculated for each group. For example, in a case in which the images stored in the memory card 12 include the images obtained by imaging at a wedding and the images obtained by imaging during travel on a day different from a wedding day, for example, a plurality of imaging operations are performed at the wedding for several hours to obtain a plurality of wedding images and a plurality of imaging operations are performed during travel on the day different from the wedding day to obtain a plurality of travel images. Since there is a difference between the imaging periods of the images, it is possible to separate a wedding image group from a travel image group. The imaging period of the wedding images is calculated to be, for example, a day and the imaging period of the travel images is calculated to be, for example, a week. Since data indicating the imaging date and time is stored in the header of the image file, it is possible to calculate the imaging period using the data indicating the imaging date and time.

Then, the CPU 2 detects persons that are included in each of the plurality of images stored at the storage location and calculates the number of detected persons (Step 63).

In addition, the CPU 2 detects the imaging location of each of the plurality of images stored at the storage location (Step 64). Since data indicating the imaging location is stored in the header of the image file, the CPU 2 reads the data indicating the imaging location and recognizes the imaging location of the image.

When the CPU 2 reads the object tag given to the image (Step 61), calculates the imaging period (Step 62), calculates the number of persons (Step 63), and detects the imaging location (Step 64), the CPU 2 determines a plurality of theme candidates from the read object tag, the calculated imaging period, the calculated number of persons, and the detected imaging location (Step 65). For example, in a case in which many object tags associated with "travel" and a "wedding" are read, the "travel" and the "wedding" are theme candidates. In addition, in a case in which the imaging period is a day, a theme, such as a "child" or a "wedding", with which the images are taken in a day is the theme candidate. When the calculated number of persons is 2, the persons are likely to be a married couple. When the calculated number of persons is 3 to 5, the persons are likely to be a family. When the imaging location is a school, a "child" is the theme candidate. When the imaging location is a tourist spot, "travel" is the theme candidate. When the imaging location is a wedding hall, a "wedding" is the theme candidate.

The theme candidate is determined on the basis of the object tag and a theme candidate evaluation value is calculated. For example, in a case in which many vehicle images or tourist spot images are included in a plurality of images, "travel" is determined as the theme candidate and a theme candidate evaluation value that corresponds to most of the object tags corresponding to the determined theme candidate is calculated. The calculated theme candidate is corrected by the calculated imaging period, the calculated number of persons, and the imaging location. For example, in the case of "travel", images are taken for several days. Therefore, in a case in which the imaging period is several days, a "travel" theme candidate evaluation value is high. In addition, in the case of "travel", for example, married couple travel or family travel is considered. In addition, landscape images are generally considered. Therefore, in a case in which there are many images in which the number of persons is 2 to 5 or the number of persons is 0, the "travel" theme candidate evaluation value is high. In a case in which the imaging location is, for example, a tourist spot, the "travel" theme candidate evaluation value is also high. As such, the determined theme candidate is corrected such that a theme candidate evaluation value corresponding thereto is high (or low) and the CPU 2 determines a theme candidate with the highest corrected theme candidate evaluation value to be the first theme (Step 66). In addition, the CPU 2 determines a theme candidate with the second highest corrected theme candidate evaluation value that is less than the theme candidate evaluation value of the first theme to be the second theme. Of course, the first theme and the second theme may be determined by other methods.

According to Embodiment 1, it is possible to perform the second image extraction process based on the second theme, in addition to the first image extraction process. Therefore, in a case in which it is difficult to appropriately extract an image in the first image extraction process, it is possible to perform the second image extraction process. Relatively appropriate images are extracted by the second image extraction process.

Embodiment 2

Figure 11:
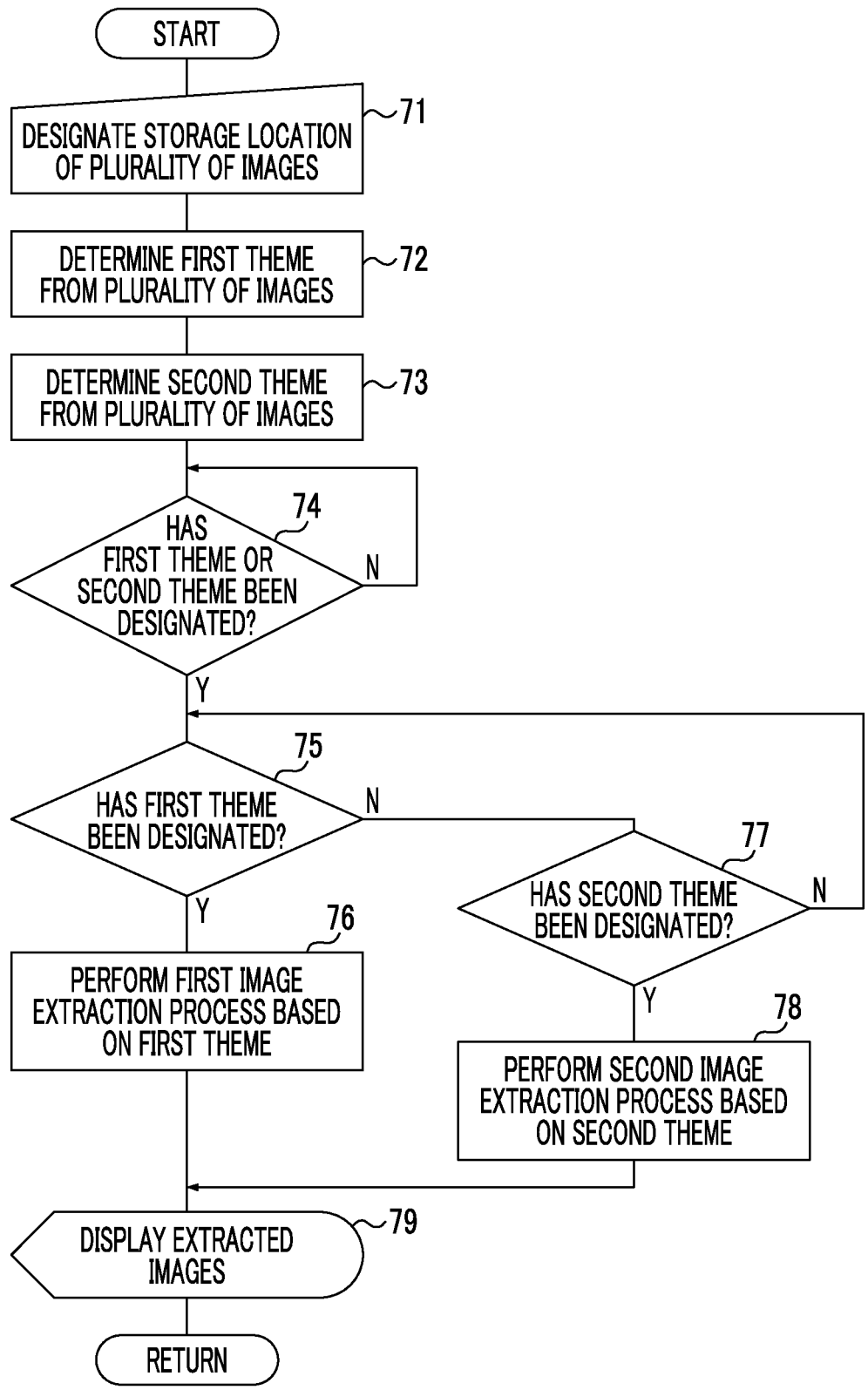
FIG. 11 is a flowchart illustrating the procedure of an image extraction system.
Figure 12:
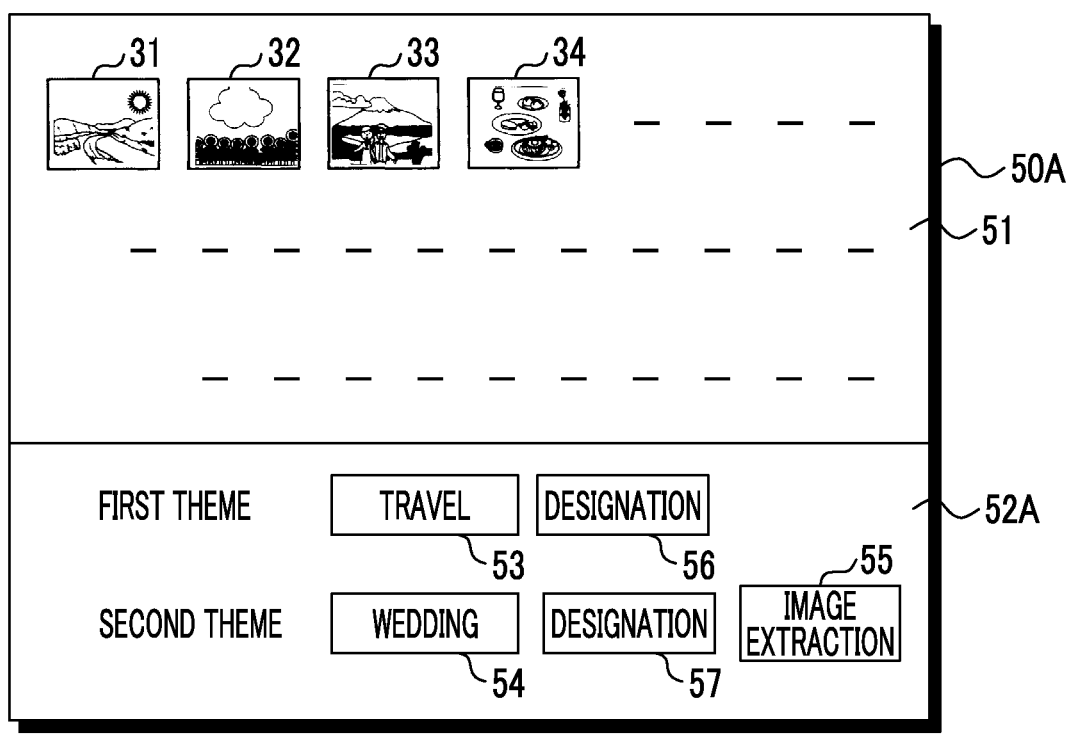
FIG. 12 illustrates an example of a theme determination window.

FIGS. 11 and 12 illustrate Embodiment 2.

FIG. 11 is a flowchart illustrating the procedure of an image extraction system 1. FIG. 11 corresponds to FIG. 7 in Embodiment 1. FIG. 12 illustrates an example of a theme determination window 50A. FIG. 12 corresponds to FIG. 8 in Embodiment 1.

Similarly to Steps 41 to 43 of FIG. 7, the storage location of a plurality of images is designated (Step 71), the first theme is determined from the plurality of images (Step 72), and the second theme is determined from the plurality of images (Step 73).

In this embodiment, the user designates one of the determined first and second themes (Step 74).

Referring to FIG. 12, a theme determination window 50A includes an image display region 51 and a theme display region 52A.

In the theme display region 52A, a first designation button 56 to which letters "designation" are given is formed next to a first theme display box 53 and a second designation button 57 to which letters "designation" are given is formed next to a second theme display box 54.

The user clicks the first designation button 56 with the mouse 4 to designate a theme displayed in the first theme display box 53. The user clicks the second designation button 57 with the mouse 4 to designate a theme displayed in the second theme display box 54. At least one of the theme displayed in the first theme display box 53 and the theme displayed in the second theme display box 54 may be removed and a theme that is newly input by the user may be designated.

When the user designates the first theme (YES in Step 75), the CPU 2 (a theme receiving device) receives the designated first theme and performs a first image extraction process that extracts images associated with the first theme from a plurality of images, as in Step 46 of FIG. 7 (Step 76).

When the user designates the second theme (NO in Step 75), the CPU 2 (a theme receiving device) receives the designated second theme and performs a second image extraction process that extracts images associated with the second theme from the plurality of images, as in Step 47 of FIG. 7 (Step 78).

The extracted images are displayed on the display screen of the display device 10 (Step 79).

According to Embodiment 2, an image extraction process is performed on the basis of the theme designated by the user.

Embodiment 3

Figure 13:
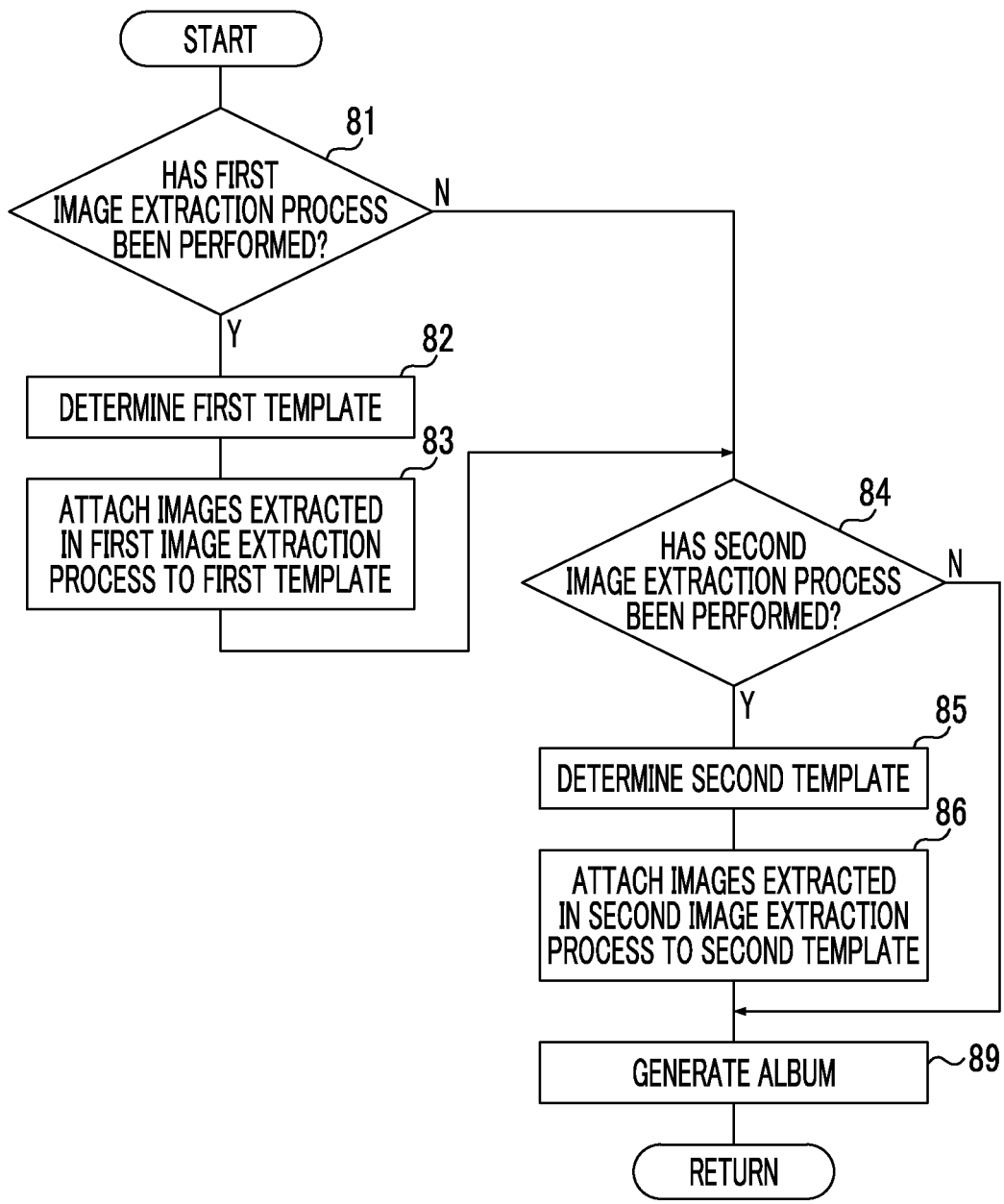
FIG. 13 is a flowchart illustrating the procedure of an image extraction system.

FIG. 13 illustrates Embodiment 3 and is a flowchart illustrating the procedure of the image extraction system 1.

A process illustrated in FIG. 13 is performed after the process illustrated in FIG. 7 in Embodiment 1 or the process illustrated in FIG. 11 in Embodiment 2.

Similarly to the object tag table, templates are stored in the memory 8 so as to be associated with themes. The template includes a plurality of pages and an image attachment region is defined in each page. The images extracted as described above are attached to the image attachment region defined in the template to generate an album (electronic album). The images are printed on sheets to generate a paper album.

In a case in which the first image extraction process is performed (YES in Step 81), which means that the images coinciding with the first theme have been extracted, the CPU 2 (a template determination device) determines a template associated with the first theme (Step 82).

FIG. 14 illustrates an example of a template table.

The template table is stored in the memory 8.

A plurality of templates (data for specifying the templates) and template evaluation values are stored so as to correspond to themes. For example, a template T1 and a template T2 are stored so as to correspond to a "child" theme, a template T11 and a template T12 are stored so as to correspond to a "travel" theme, and a template T21 and a template T22 are stored so as to correspond to a "wedding" theme. For example, template evaluation values L1 and L2 indicating the degrees of coincidence with the themes are calculated for each template. The templates with the same theme are likely to have different template evaluation values.

As the template evaluation value becomes larger, the template is more suitable for the theme.

Returning to FIG. 13, in a case in which the first image extraction process is performed (YES in Step 81), the CPU 2 searches for the template that is stored so as to correspond to the determined first theme from the template table in order to determine the template associated with the first theme. For example, when the first theme is "travel", the CPU 2 searches for, for example, the template T11 and the template T12 associated with the "travel" theme. Then, the CPU 2 determines the template with a template evaluation value close to the theme candidate evaluation value, which has been calculated when the first theme is determined, to be a first template. The CPU 2 standardizes both the template evaluation value and the theme candidate evaluation value so as to fall in the range of, for example, 0 to 100 and determines whether the values are close to each other (whether the difference between the template evaluation value and the theme candidate evaluation value is less than a predetermined value).

When the first template is determined, the images extracted in the first image extraction process are attached to the first template (Step 83).

In a case in which the first image extraction process is not performed (NO in Step 81), Steps 82 and 83 are skipped. When the second image extraction process is performed (YES in Step 84), the CPU 2 (a template determination device) determines a second template on the basis of the second theme, using the same method as that for determining the first template (Step 85).

When the second template is determined, the images extracted in the second image extraction process are attached to the second template (Step 86).

In a case in which both the first image extraction process and the second image extraction process are performed, the CPU 2 generates an album (electronic album) from the first template having the images attached thereto and the second template having the images attached thereto (Step 87). Two albums, that is, an album including only the first template having the images attached thereto and an album including only the second template having the images attached thereto may be generated. Alternatively, one album including the first template having the images attached thereto and the second template having the images attached thereto may be generated.

According to Embodiment 3, it is possible to determine a template associated with a theme.

Embodiment 4

Figure 15:
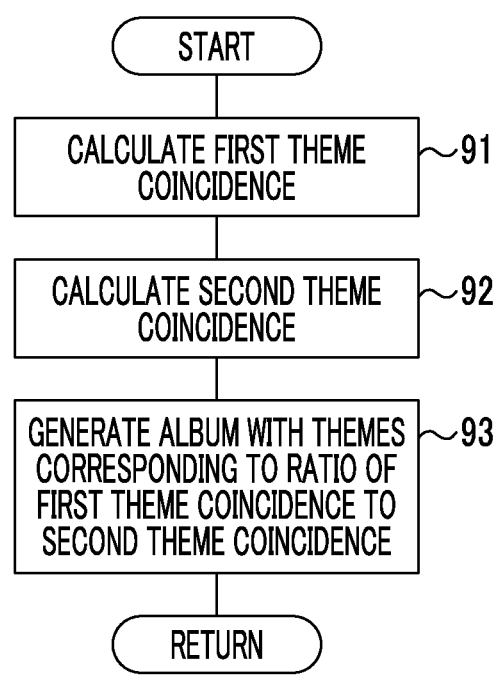
FIG. 15 is a flowchart illustrating the procedure of an image extraction system.

FIG. 15 illustrates Embodiment 4 and is a flowchart illustrating the procedure of the image extraction system 1.

A process illustrated in FIG. 15 is performed after the process illustrated in FIG. 7 in Embodiment 1 or the process illustrated in FIG. 11 in Embodiment 2.

The CPU 2 (a first theme coincidence calculation device) calculates a first theme coincidence indicating the degree of coincidence with the determined first theme (Step 91). The first theme candidate evaluation value calculated when the first theme is determined can be used as the first theme coincidence. In addition, a plurality of images may be classified according to themes and a value obtained by dividing the number of images included in the first theme by the total number of images may be used as the first theme coincidence. Any value indicating the degree of coincidence with the first theme may be used as the first theme coincidence.

Similarly, the CPU 2 (a second theme coincidence calculation device) calculates a second theme coincidence indicating the degree of coincidence with the second theme (Step 92). The second theme candidate evaluation value calculated when the second theme is determined can be used as the second theme coincidence. In addition, a plurality of images may be classified according to themes and a value obtained by dividing the number of images included in the second theme by the total number of images may be used as the second theme coincidence. Any value indicating the degree of coincidence with the second theme may be used as the second theme coincidence.

Then, the CPU 2 (an album generation device) generates an album with themes corresponding to the ratio of the calculated first theme coincidence to the calculated second theme coincidence, using the extracted images (Step 93). The album with the themes corresponding to the ratio of the calculated first theme coincidence to the calculated second theme coincidence means an album in which the ratio of the theme coincidence calculated as the first theme coincidence to the theme coincidence calculated as the second theme coincidence when the theme coincidence is calculated for the album to be generated is the above-mentioned ratio. For example, it is assumed that the first theme is "travel", the first theme coincidence is 60 (it is assumed that the theme coincidence is in the range of 0 to 100), the second theme is a "wedding", and the second theme coincidence is 40. In this case, an album may be generated using a template in which the template evaluation value of the first theme "travel" is 60 and the template evaluation value of the second theme "wedding" is 40. Alternatively, an album may be generated in which the ratio of the number of images extracted on the basis of the first theme to the number of images extracted on the basis of the second theme is 60:40. In a case in which a theme is determined from images, an album may be generated from the extracted images which are determined to be the first theme and the second theme at a ratio of 60:40.

According to Embodiment 4, it is possible to generate an album according to the ratio of the first theme coincidence to the second theme coincidence.

Embodiment 5

Figure 16:
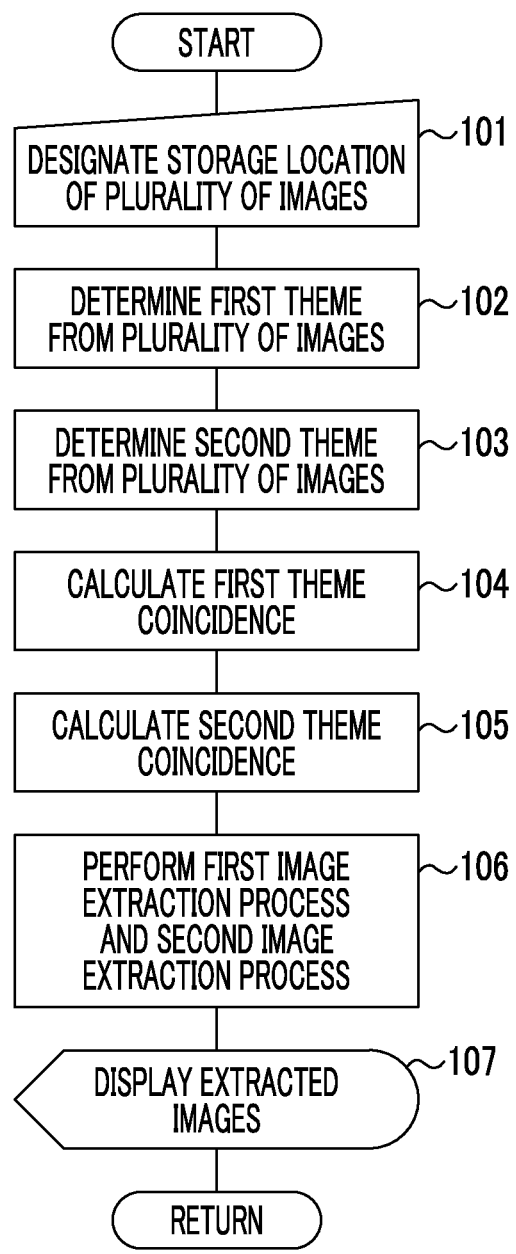
FIG. 16 is a flowchart illustrating the procedure of an image extraction system.

FIG. 16 illustrates Embodiment 5 and is a flowchart illustrating the procedure of the image extraction system 1. FIG. 16 corresponds to FIG. 7 in Embodiment 1 and FIG. 11 in Embodiment 2.

Similarly to Steps 41 to 43 in FIG. 7, the user designates the storage location of a plurality of images (Step 101), the first theme is determined from the plurality of images (Step 102), and the second theme is determined from the plurality of images (Step 103). In addition, the first theme coincidence is calculated (Step 104) and the second theme coincidence is calculated (Step 105).

The CPU 2 performs the first image extraction process and the second image extraction process such that the ratio of the calculated first theme coincidence to the calculated second theme coincidence is equal to the ratio of the number of images extracted by the first image extraction process to the number of images extracted by the second image extraction process (Step 106). The extracted images are displayed on the display screen of the display device 10.

The CPU 2 may attach the extracted images to a template to generate an album.

According to Embodiment 5, it is possible to extract images corresponding to the first theme and images corresponding to the second theme according to the ratio of the first theme coincidence to the second theme coincidence.

Embodiment 6

Figure 17:
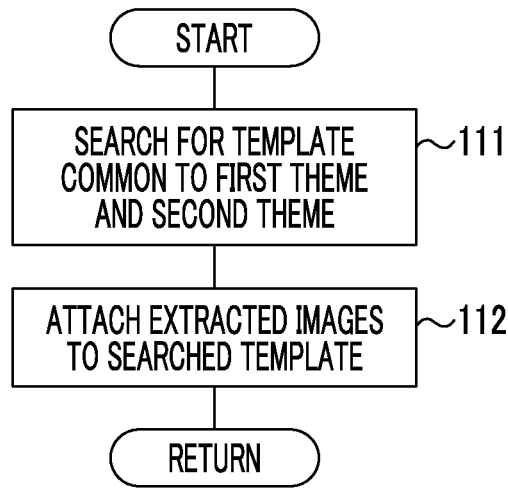
FIG. 17 is a flowchart illustrating the procedure of an image extraction system.

FIG. 17 illustrates Embodiment 6 and is a flowchart illustrating the procedure of the image extraction system 1.

A process illustrated in FIG. 17 is performed after the process illustrated in FIG. 7 in Embodiment 1, the process illustrated in FIG. 11 in Embodiment 2, or the process illustrated in FIG. 16 in Embodiment 5.

When images are extracted from a plurality of images, the CPU 2 searches for a template to which the extracted images are attached and which is used to generate an album. The CPU 2 searches for the template that is common to the determined first and second themes. For example, when "travel" is determined as the first theme and a "wedding" is determined as the second theme, the CPU 2 searches for a template that is stored so as to correspond to both the "travel" theme and the "wedding" theme, with reference to the template table illustrated in FIG. 14. In a case in which the CPU 2 does not search for a template common to the determined first and second themes, the CPU 2 generates the template common to the determined first and second themes.

The CPU 2 (an album generation device) attaches the extracted images to the searched template (or the generated template) to generate an album (electronic album) (Step 112).

According to Embodiment 6, it is possible to generate an album using a template corresponding to both the first theme and the second theme.

Embodiment 7

Figure 18:
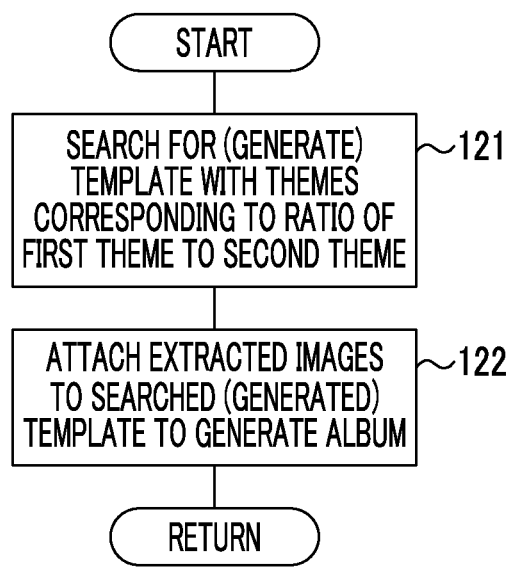
FIG. 18 is a flowchart illustrating the procedure of an image extraction system.

FIG. 18 illustrates Embodiment 7 and is a flowchart illustrating the procedure of the image extraction system 1.

Similarly to the process illustrated in FIG. 17 in Embodiment 6, a process illustrated in FIG. 18 is performed after the process illustrated in FIG. 7 in Embodiment 1, the process illustrated in FIG. 11 in Embodiment 2, or the process illustrated in FIG. 16 in Embodiment 5.

When images are extracted from a plurality of images, the CPU 2 searches for a template to which the extracted images are attached and which is used to generate an album. In the embodiment illustrated in FIG. 18, the CPU 2 searches for a template with themes corresponding to the ratio of the determined first theme to the determined second theme. The template with the themes corresponding to the ratio of the determined first theme to the determined second theme means a template in which the first theme and the second theme are determined at the ratio in a case in which the themes are determined for the template. For example, in a case in which the first theme is "travel" and the second theme is a "wedding", assuming that the likelihood of the first theme (corresponding to the theme candidate evaluation value as described above) among a plurality of images is 60% and the likelihood of the second theme among the plurality of images is 40%, the CPU 2 searches for a template in which the first theme and the second theme are determined at a ratio of 6:4 (Step 121). In a case in which the template is not present, the CPU 2 generates the template. The CPU 2 may search for or generate a template corresponding to the ratio of the theme candidate evaluation value of the first theme to the theme candidate evaluation value of the second theme, or may search for or generate a template with themes corresponding to the ratio of the determined first theme to the determined second theme.

The CPU 2 (an album generation device) attaches the extracted images to the searched template (or the generated template) to generate an album (electronic album) (Step 122).

Figure 19:
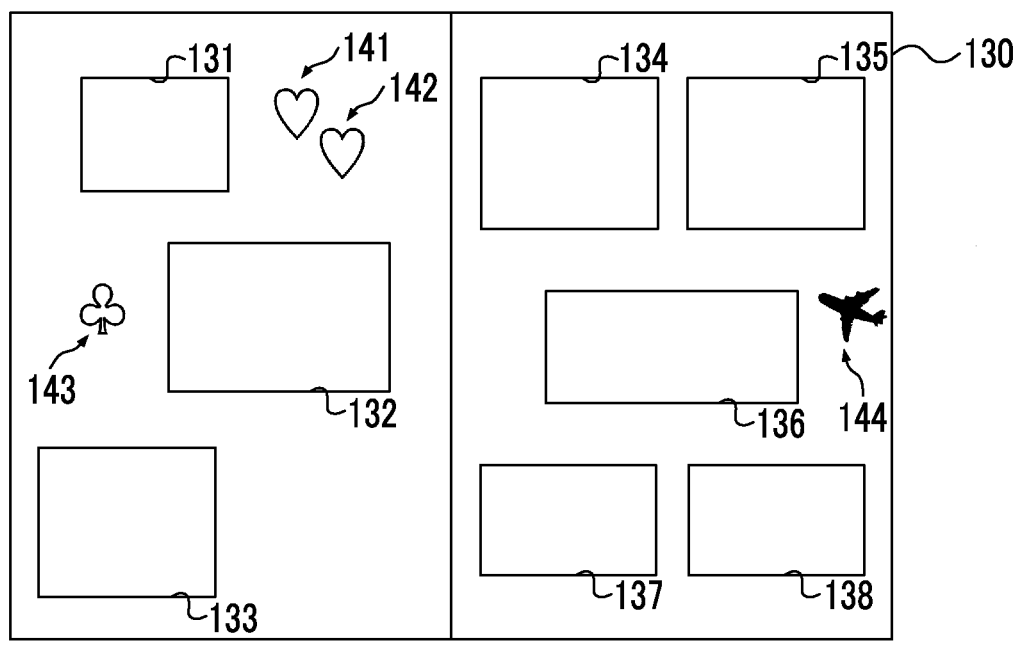
FIG. 19 illustrates an example of a template.

FIG. 19 illustrates an example of a template 130 with themes corresponding to the ratio of the first theme to the second theme.

The template 130 indicates some pages forming an album. An album including a plurality of pages may be used or the template 130 including only one page may be used.

Image attachment regions 131 to 138 are formed in the template 130. The CPU 2 attaches the extracted images to the image attachment regions 131 to 138.

In the template 130, an airplane mark 144 is formed so as to correspond to "travel" which is the first theme and heart marks 141 and 142 are formed so as to correspond to a "wedding" which is the second theme. In addition, a clover mark 143 is formed in the template 130. The template 130 has a color corresponding to the ratio of the first theme "travel" and the second theme "wedding". For example, the likelihood of the first theme calculated for the template 130 is 60% and the likelihood of the second theme calculated for the template 130 is 40%. The template 130 is searched for (generated) and the extracted images are attached to the image attachment regions 131 to 138.

In a case in which a template includes a plurality of pages, the ratio of the number of pages determined to be the first theme to the number of pages determined to be the second theme among the plurality of pages may correspond to the ratio of the first theme to the second theme. For example, when the first theme is "travel", the percentage of the first theme is 60%, the second theme is a "wedding", and the percentage of the second theme is 40%, 60% of the pages may be determined to be the first theme "travel" and 40% of the pages may be determined to be the second theme "wedding".

According to Embodiment 7, it is possible to generate an album using a template corresponding to both the first theme and the second theme.

Embodiment 8

Figure 20:
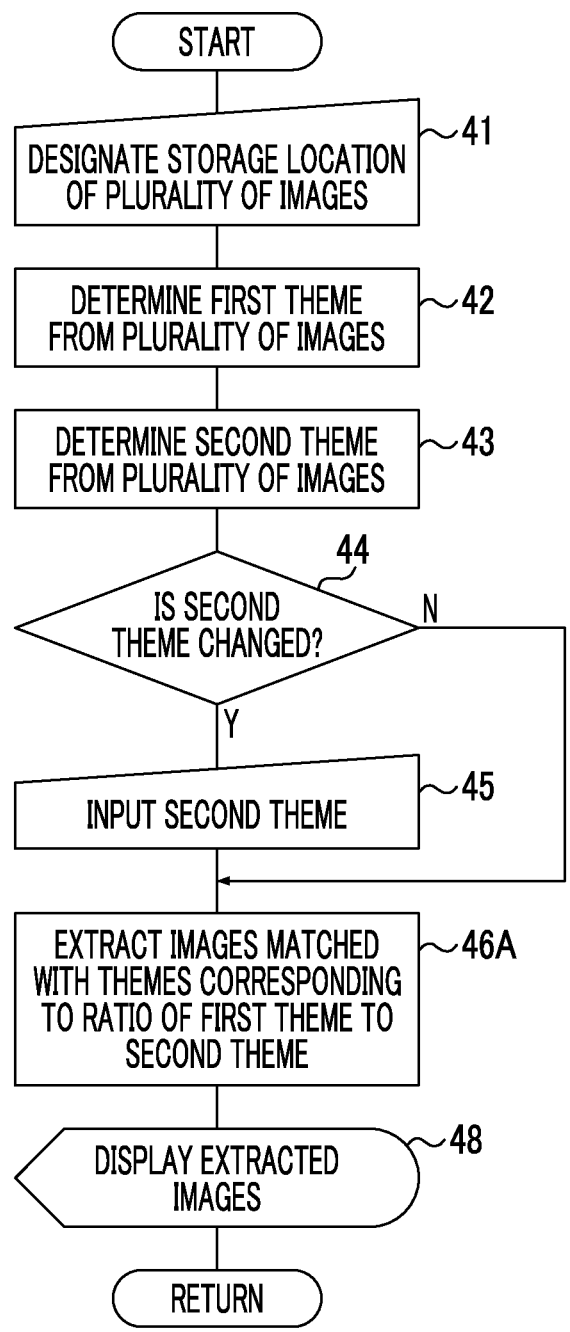
FIG. 20 is a flowchart illustrating the procedure of an image extraction system.

FIG. 20 illustrates Embodiment 8 and is a flowchart illustrating the procedure of the image extraction system 1. FIG. 20 corresponds to FIG. 7 in Embodiment 1, FIG. 11 in Embodiment 2, and FIG. 16 in Embodiment 5. In FIG. 20, the same processes as those in FIG. 7 are denoted by the same reference numerals and the description thereof will not be repeated.

When the first theme and the second theme are determined (input), the CPU 2 extracts images matched with the themes corresponding to the ratio of the determined first theme and the determined second theme (Step 46A). For example, among the images extracted from a plurality of images, 60% of the images which are matched with the first theme are extracted and 40% of the images which are matched with the second theme are extracted. The extracted images may be attached to, for example, the template 130 to generate an album. The generated album has themes corresponding to the ratio of the first theme and the second theme.

According to Embodiment 8, it is possible to generate an album including images corresponding to the ratio of the first theme to the second theme.

Embodiment 9

FIG. 21 illustrates Embodiment 9 and is a flowchart illustrating the procedure of the image extraction system 1.

FIG. 21 corresponds to FIG. 7 in Embodiment 1, FIG. 11 in Embodiment 2, FIG. 16 in Embodiment 5, and FIG. 20 in Embodiment 8.

As described above, the user designates the storage location of a plurality of images (Step 151) and the first theme is determined from the plurality of images stored at the designated storage location (Step 152). Then, the user inputs the second theme using the keyboard 3 (Step 153) and the CPU 2 receives the input. In this way, the second theme is determined. For example, as illustrated in FIG. 8, a plurality of images (thumbnail images) 31 are displayed in the image display region 51 and the user inputs the second theme while viewing the displayed images. The first theme determined by the CPU 2 is displayed in the first theme display box 53 and the second theme input by the user is displayed in the second theme display box 54.

The CPU 2 (a first theme coincidence calculation device) calculates the first theme coincidence (Step 154). In addition, the CPU 2 (a second theme coincidence calculation device) calculates the second theme coincidence (Step 155).

The CPU 2 determines whether the first theme coincidence calculated by the CPU 2 is higher than the second theme coincidence input by the user (Step 156). In a case in which the first theme coincidence is higher than the second theme coincidence (YES in Step 156), it is considered that the first theme determined by the CPU 2 is more suitable as the theme indicated by the plurality of images than the second theme input by the user. Therefore, the CPU 2 performs the first image extraction process on the basis of the first theme (Step 157).

In a case in which the first theme coincidence is not higher than the second theme coincidence (NO in Step 156), the CPU 2 determines whether the second theme coincidence input by the user is higher than the first theme coincidence calculated by the CPU 2 (Step 158). In a case in which the second theme coincidence is higher than the first theme coincidence (YES in Step 158), it is considered that the second theme input by the user is more suitable as the theme indicated by the plurality of images than the first theme determined by the CPU 2. Therefore, the CPU 2 performs the second image extraction process on the basis of the second theme (Step 159).

The images extracted by the first image extraction process or the second image extraction process are displayed on the display screen of the display device 10 (Step 160). In addition, the extracted images may be attached to a template to generate an album.

According to Embodiment 9, it is possible to perform an image extraction process based on more suitable one of the first theme and the second theme.

According to the above-described embodiments, the image extraction system 1 including the keyboard 3 or the mouse 4 has been described above. However, the above-mentioned processes may be performed by smart devices such as smartphones and tablet terminals without the keyboard 3 or the mouse 4. In a case in which the above-mentioned processes are performed by a smart device, commands are input through a touch panel formed in the smart device.

What is claimed is:

1. An image extraction system comprising:
a first theme determination device for determining a first theme indicated by a plurality of images from the plurality of images;
a second theme determination device for determining a second theme indicated by the plurality of images from the plurality of images or receiving the input second theme and determining the second theme;
an image extraction device for performing at least one of a first image extraction process that extracts an image associated with the first theme determined by the first theme determination device from the plurality of images or a second image extraction process that extracts an image associated with the second theme determined by the second theme determination device from the plurality of images;
a template determination device for determining a first template associated with the first theme in a case in which the image extraction device performs the first image extraction process and determining a second template associated with the second theme in a case in which the image extraction device performs the second image extraction process; and
an album generation device for attaching the image extracted in the first image extraction process to the first template in a case in which the template determination device determines the first template and attaching the image extracted in the second image extraction process to the second template in a case in which the template determination device determines the second template to generate an album including the first template and the second template.

2. The image extraction system according to claim 1,
wherein the second theme determination device determines the second theme indicated by the plurality of images from the plurality of images,
the image extraction system further comprises a theme receiving device for receiving the designation of the first theme determined by the first theme determination device or the second theme determined by the second theme determination device,
in a case in which the theme receiving device receives the designation of the first theme, the image extraction device performs the first image extraction process that extracts the image associated with the first theme from the plurality of images, and
in a case in which the theme receiving device receives the designation of the second theme, the image extraction device performs the second image extraction process that extracts the image associated with the second theme from the plurality of images.

3. The image extraction system according to claim 1, further comprising:
an album generation device for attaching the images extracted by the image extraction device to a template that is common to the first theme determined by the first theme determination device and the second theme determined by the second theme determination device to generate an album.

4. The image extraction system according to claim 1, further comprising:
an album generation device for attaching the images extracted by the image extraction device to a template with themes corresponding to a ratio of the first theme determined by the first theme determination device to the second theme determined by the second theme determination device to generate an album.

5. The image extraction system according to claim 4, further comprising:
a template generation device for generating the template with the themes corresponding to the ratio of the first theme determined by the first theme determination device to the second theme determined by the second theme determination device.

6. The image extraction system according to claim 1, wherein the image extraction device performs at least one of the first image extraction process or the second image extraction process which extracts images matched with themes corresponding to a ratio of the first theme determined by the first theme determination device to the second theme determined by the second theme determination device.

7. The image extraction system according to claim 1, wherein the second theme determination device receives the input second theme and determines the second theme, the image extraction system further comprises:
a first theme coincidence calculation device for calculating a first theme coincidence indicating a degree of coincidence with the first theme determined by the first theme determination device for the plurality of images; and
a second theme coincidence calculation device for calculating a second theme coincidence indicating a degree of coincidence with the second theme determined by the second theme determination device for the plurality of images, and
the image extraction device performs the first image extraction process in a case in which the first theme coincidence calculated by the first theme coincidence calculation device is higher than the second theme coincidence calculated by the second theme coincidence calculation device and performs the second image extraction process in a case in which the second theme coincidence calculated by the second theme coincidence calculation device is higher than the first theme coincidence calculated by the first theme coincidence calculation device.

8. An image extraction system comprising:
a first theme determination device for determining a first theme indicated by a plurality of images from the plurality of images;
a second theme determination device for determining a second theme indicated by the plurality of images from the plurality of images or receiving the input second theme and determining the second theme;
an image extraction device for performing at least one of a first image extraction process that extracts an image associated with the first theme determined by the first theme determination device from the plurality of images or a second image extraction process that extracts an image associated with the second theme determined by the second theme determination device from the plurality of images;
a first theme coincidence calculation device for calculating a first theme coincidence indicating a degree of coincidence with the first theme determined by the first theme determination device for the plurality of images;
a second theme coincidence calculation device for calculating a second theme coincidence indicating a degree of coincidence with the second theme determined by the second theme determination device for the plurality of images; and
an album generation device for generating an album with themes corresponding to a ratio of the first theme coincidence calculated by the first theme coincidence calculation device to the second theme coincidence calculated by the second theme coincidence calculation device, using the images extracted by the image extraction device.

9. The image extraction system according to claim 8, wherein the image extraction device performs the first image extraction process and the second image extraction process such that the ratio of the first theme coincidence calculated by the first theme coincidence calculation device to the second theme coincidence calculated by the second theme coincidence calculation device is equal to a ratio of the number of images extracted by the first image extraction process to the number of images extracted by the second image extraction process.

10. An image extraction method comprising:
allowing a first theme determination device to determine a first theme indicated by a plurality of images from the plurality of images;
allowing a second theme determination device to determine a second theme indicated by the plurality of images from the plurality of images or to receive the input second theme and to determine the second theme;
allowing an image extraction device to perform at least one of a first image extraction process that extracts an image associated with the first theme determined by the first theme determination device from the plurality of images or a second image extraction process that extracts an image associated with the second theme determined by the second theme determination device from the plurality of images;
allowing a template determination device to determine a first template associated with the first theme in a case in which the image extraction device performs the first image extraction process and determining a second template associated with the second theme in a case in which the image extraction device performs the second image extraction process; and
allowing an album generation device to attach the image extracted in the first image extraction process to the first template in a case in which the template determination device determines the first template and attaching the image extracted in the second image extraction process to the second template in a case in which the template determination device determines the second template to generate an album including the first template and the second template.

11. An image extraction method comprising:
allowing a first theme determination device to determine a first theme indicated by a plurality of images from the plurality of images;
allowing a second theme determination device to determine a second theme indicated by the plurality of images from the plurality of images or to receive the input second theme and to determine the second theme;
allowing an image extraction device to perform at least one of a first image extraction process that extracts an image associated with the first theme determined by the first theme determination device from the plurality of images or a second image extraction process that extracts an image associated with the second theme determined by the second theme determination device from the plurality of images;
allowing a first theme coincidence calculation device to calculate a first theme coincidence indicating a degree of coincidence with the first theme determined by the first theme determination device for the plurality of images;

allowing a second theme coincidence calculation device to calculate a second theme coincidence indicating a degree of coincidence with the second theme determined by the second theme determination device for the plurality of images; and an album generation device for generating an album with themes corresponding to a ratio of the first theme coincidence calculated by the first theme coincidence calculation device to the second theme coincidence calculated by the second theme coincidence calculation device, using the images extracted by the image extraction device.

12. Non-transitory computer readable medium storing a program that controls a computer of an image extraction system to perform:

determining a first theme indicated by a plurality of images from the plurality of images;

determining a second theme indicated by the plurality of images from the plurality of images or receiving the input second theme and determining the second theme;

performing at least one of a first image extraction process that extracts an image associated with the determined first theme from the plurality of images or a second image extraction process that extracts an image associated with the determined second theme from the plurality of images;

determining a first template associated with the first theme in a case in which the image extraction system performs the first image extraction process and determining a second template associated with the second theme in a case in which the image extraction system performs the second image extraction process; and attaching the image extracted in the first image extraction process to the first template in a case in which the template determination device determines the first template and attaching the image extracted in the second image extraction process to the second template in a case in which the template determination process determines the second template to generate an album including the first template and the second template.

13. Non-transitory computer readable medium storing a program that controls a computer of an image extraction system to perform:

determining a first theme indicated by a plurality of images from the plurality of images;

determining a second theme indicated by the plurality of images from the plurality of images or receiving the input second theme and determining the second theme;

performing at least one of a first image extraction process that extracts an image associated with the determined first theme from the plurality of images or a second image extraction process that extracts an image associated with the determined second theme from the plurality of images;

calculating a first theme coincidence indicating a degree of coincidence with the determined first theme for the plurality of images;

calculating a second theme coincidence indicating a degree of coincidence with the determined second theme for the plurality of images; and generating an album with themes corresponding to a ratio of the calculated first theme coincidence to the calculated second theme coincidence, using the extracted images.

14. An image extraction system comprising:

a first theme determination device for determining a first theme indicated by a plurality of images from the plurality of images;

a second theme determination device for determining a second theme indicated by the plurality of images from the plurality of images or receiving the input second theme and determining the second theme;

a processor circuitry configured for performing at least one of a first image extraction process that extracts an image associated with the first theme determined by the first theme determination device from the plurality of images or a second image extraction process that extracts an image associated with the second theme determined by the second theme determination device from the plurality of images;

a template determination device for determining a first template associated with the first theme in a case in which the first image extraction process is performed and determining a second template associated with the second theme in a case in which the second image extraction process is performed; and an album generation device for attaching the image extracted in the first image extraction process to the first template in a case in which the template determination device determines the first template and attaching the image extracted in the second image extraction process to the second template in a case in which the template determination device determines the second template to generate an album including the first template and the second template.

15. An image extraction system comprising:

a first theme determination device for determining a first theme indicated by a plurality of images from the plurality of images;

a second theme determination device for determining a second theme indicated by the plurality of images from the plurality of images or receiving the input second theme and determining the second theme;

a processor circuitry configured for performing at least one of a first image extraction process that extracts an image associated with the first theme determined by the first theme determination device from the plurality of images or a second image extraction process that extracts an image associated with the second theme determined by the second theme determination device from the plurality of images;

a first theme coincidence calculation device for calculating a first theme coincidence indicating a degree of coincidence with the first theme determined by the first theme determination device for the plurality of images;

a second theme coincidence calculation device for calculating a second theme coincidence indicating a degree of coincidence with the second theme determined by the second theme determination device for the plurality of images; and an album generation device for generating an album with themes corresponding to a ratio of the first theme coincidence calculated by the first theme coincidence calculation device to the second theme coincidence calculated by the second theme coincidence calculation device, using the images extracted by the image extraction device.

* * * * *